(12) United States Patent
Simoncelli

(10) Patent No.: US 10,848,396 B2
(45) Date of Patent: *Nov. 24, 2020

(54) CONTAINER HOST DISCOVERY

(71) Applicant: Red Hat, Inc., Raleigh, NC (US)

(72) Inventor: Federico Simoncelli, Fano (IT)

(73) Assignee: Red Hat, Inc., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/239,697

(22) Filed: Jan. 4, 2019

(65) Prior Publication Data

US 2019/0140923 A1 May 9, 2019

Related U.S. Application Data

(63) Continuation of application No. 14/626,431, filed on Feb. 19, 2015, now Pat. No. 10,218,585.

(51) Int. Cl.
| | |
|---|---|
| *H04L 12/24* | (2006.01) |
| *H04L 29/08* | (2006.01) |
| *G06F 9/455* | (2018.01) |
| *G06F 9/50* | (2006.01) |

(52) U.S. Cl.
CPC ...... *H04L 41/5054* (2013.01); *G06F 9/45533* (2013.01); *G06F 9/45558* (2013.01); *G06F 9/5077* (2013.01); *H04L 67/16* (2013.01); *G06F 2009/45591* (2013.01)

(58) Field of Classification Search
CPC ....... G06F 2009/4557; G06F 2209/506; G06F 9/45533; G06F 9/5027
See application file for complete search history.

(56) References Cited

U.S. PATENT DOCUMENTS

| | | | |
|---|---|---|---|
| 8,020,041 B2 | 9/2011 | Huang et al. | |
| 8,407,696 B2 | 3/2013 | Alpern et al. | |
| 8,468,548 B2 | 6/2013 | Kulkarni et al. | |
| 8,621,069 B1 | 12/2013 | Tompkins | |
| 8,739,157 B2 | 5/2014 | Ho et al. | |
| 2011/0131571 A1 | 6/2011 | Heim | |
| 2012/0158920 A1* | 6/2012 | Yang | G06F 8/61 709/220 |
| 2014/0040656 A1* | 2/2014 | Ho | G06F 9/5077 714/3 |
| 2014/0053150 A1 | 2/2014 | Barnett et al. | |
| 2014/0380308 A1 | 12/2014 | Hassine et al. | |

(Continued)

OTHER PUBLICATIONS

Richard Barker, Paul Massiglia; Storage Area Network Essentials, John Wiley & Sons, Nov. 6, 2002, p. 469.

(Continued)

*Primary Examiner* — Joe Chacko
(74) *Attorney, Agent, or Firm* — Lowenstein Sandler LLP

(57) ABSTRACT

Systems and methods for performing discovery of hosts to be employed for hosting containerized applications. An example method may comprise: generating a host definition rule specifying a value of a host definition parameter; transmitting, to a host management service, a host discovery request comprising the host definition rule; receiving, from the host management service, an identifier of a host that satisfies the host definition rule; and providing the identifier of the host to an orchestration service employed to instantiate and run a plurality of virtualized execution environments.

20 Claims, 3 Drawing Sheets

(56) References Cited

U.S. PATENT DOCUMENTS

2015/0085665 A1     3/2015     Kompella et al.
2016/0277249 A1     9/2016     Singh et al.

OTHER PUBLICATIONS

"Anyone Tried Kubernetes on CoreOS?" Google Groups, 2014 pp. 1-174 https://groups.google.com/forum/#!msg/google-containers/4XF9G6E5cK8flwY1sFOALvOJ.

"Containers on Google Cloud Platform", Google Compute Engine, Last updated Nov. 17, 2014, 4 pages https://cloud.google.com/compute/docs/containers.

Ellingwood, Justin, "An Introduction to Kubernetes", digitalocean.com, Oct. 1, 2014, pp. 1-10 https://www.digitalocean.com/community/tutorials/an-introduction-to-kubernetes.

Sancehz, Carlos, "Scaling Docker with Kubernetes", infoq.com, Nov. 2014, 13 pages http://www.infoq.com/articles/scaling-docker-with-kubernetes.

"How to Scale Docker Containers in Production", stackoverflow.com, 2014 pp. 1-4 http://stackoverflow.com/questions/1828 5212/how-to-scale-docker-containers-in-production.

USPTO, Office Action for U.S. Appl. No. 14/626,431, dated Jan. 9, 2017.

USPTO, Final Office Action for U.S. Appl. No. 14/626,431, dated Jul. 13, 2017.

USPTO, Office Action for U.S. Appl. No. 14/626,431, dated Dec. 22, 2017.

USPTO, Final Office Action for U.S. Appl. No. 14/626,431, dated Jul. 24, 2018.

USPTO, Advisory Action for U.S. Appl. No. 14/626,431, dated Oct. 26, 2017.

USPTO, Notice of Allowance for U.S. Appl. No. 14/626,431, dated Oct. 9, 2018.

* cited by examiner

CONTAINER HOST DISCOVERY

RELATED APPLICATIONS

This application is a continuation of U.S. patent application Ser. No. 14/626,431 filed on Feb. 19, 2015, the entire content of which is incorporated by reference herein.

TECHNICAL FIELD

The present disclosure is generally related to virtualized computer systems, and is more specifically related to systems and methods for performing discovery of hosts to be employed for hosting containerized applications.

BACKGROUND

"Application container" or "container" herein shall refer to an interface between a host and a software application. The software application may comprise one or more related processes and may provide a certain service (e.g., an HTTP server, a database server, etc.). The host may be represented by a host computer system or by a virtual machine being executed by a host computer system. In the containerized execution model, the application and its dependencies (such as binaries and/or libraries that as necessary to run the application) run within the application container, which is an isolated process in the user space of the host operating system, sharing the kernel with other containers.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Described herein are methods and systems for performing container host discovery by container orchestration services.

Multiple containerized applications running on a plurality of hosts may be managed by a management platform, which may provide mechanisms for deployment, maintenance, and scaling of the applications. A containerized application management platform may employ a certain containerized execution model for packaging, instantiating, and executing the containerized applications. Such a management platform may be referred to as a "container orchestration service."

Certain implementations of container orchestration services may lack the ability to discover and manage the underlying hosts that are employed for running containerized applications. Aspects of the present disclosure address the above noted and other deficiencies by providing methods and systems for performing host discovery by container orchestration services. In accordance with one or more aspects of the present disclosure, the host discovery functions may be implemented by a host discovery component. In an illustrative example, the host discovery component may input a set of host definition parameters, which describe the requirements to hosts that may be utilized by the container orchestration service for running containerized applications. The host definition parameters may define the processor, memory, networking configuration, storage configuration, and/or other host attributes.

The host discovery component may then translate the host definition parameters into one or more host definition rules, to produce a host discovery request, which may be forwarded to a host management service. The latter may be employed to manage a plurality of host computer systems and/or a plurality of virtual machines running on one or more host computer systems. The host management service may respond to the host discovery request by transmitting identifiers of one or more hosts that satisfy the host discovery request. Responsive to receiving the host identifiers, the host discovery component may forward those identifiers to the container orchestration service.

Various aspects of the above referenced methods and systems are described in details herein below by way of examples, rather than by way of limitation.

Figure 1:
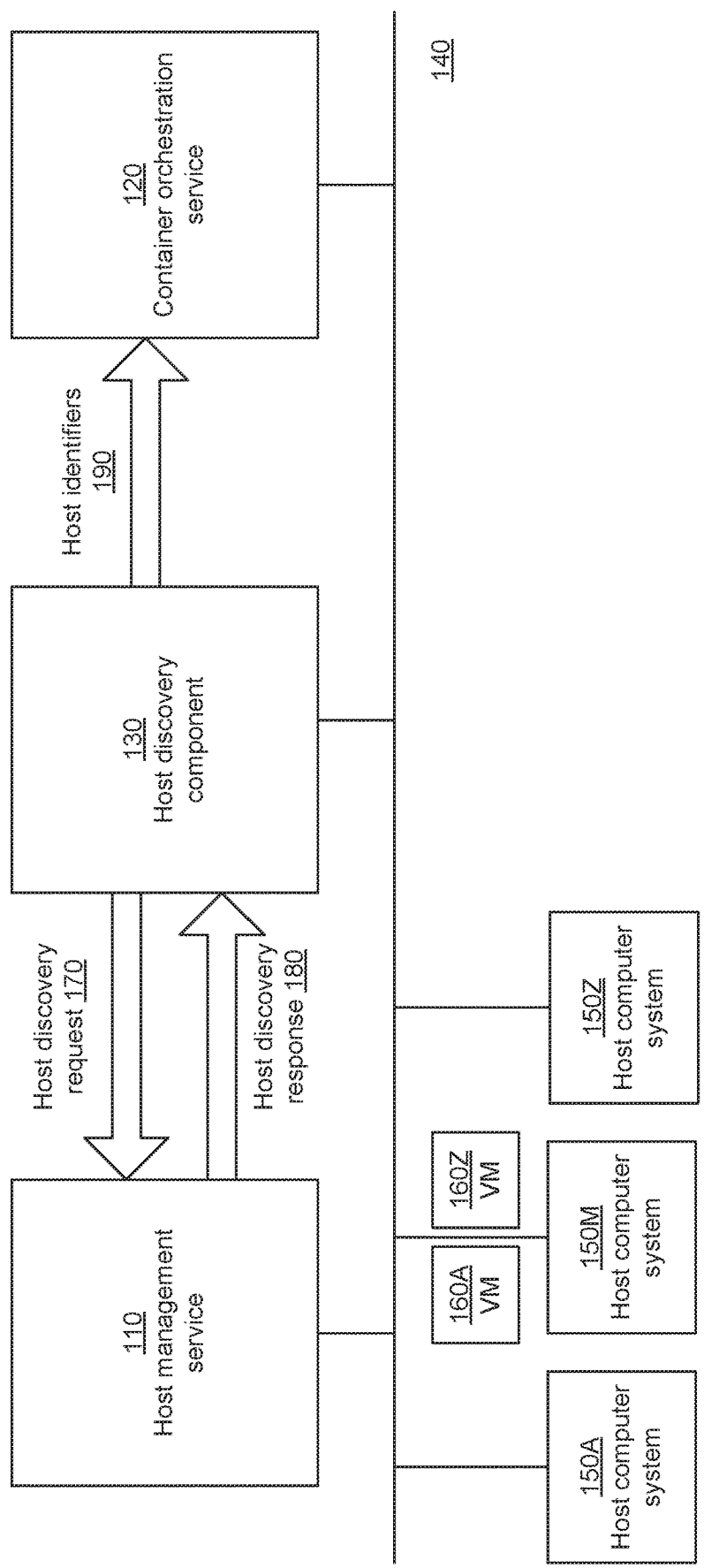
FIG. 1 depicts a high-level component diagram of an example distributed computer system operating in accordance with one or more aspects of the present disclosure.

FIG. 1 depicts a high-level component diagram of an illustrative example of a distributed computer system 100 operating in accordance with one or more aspects of the present disclosure. Distributed computer system 100 may comprise a host management service 110, a container orchestration service 120, and a host discovery component 130. Each of host management service 110, container orchestration service 120, and host discovery component 130 may be running on one or more computer systems (not shown in FIG. 1), and may communicate to each other via one or more networks 140.

Host management service 110 may be employed to manage a plurality of host computer systems 150A-150Z and/or a plurality of virtual machines 160A-160Z running on one or more host computer systems 150A-150Z. Host computer systems may be grouped into clusters. A cluster comprises two or more hosts sharing certain attributes describing the processor type, networking configuration, and/or storage configuration of the host.

An example computer system 150M may run multiple virtual machines 160A-160B, by executing a software layer, often referred to as a "virtual machine monitor" or "hypervisor," above the hardware and below the virtual machines. The hypervisor may abstract the physical layer, including processors, memory, and I/O devices, and present this abstraction to virtual machines as virtual devices. A virtual machine may execute a guest operating system, which may utilize underlying virtual processors, virtual memory, and virtual I/O devices. Under the guest operating system, one or more applications may be running on the virtual machine.

In various illustrative examples, host management service 110 may be implemented by host management platforms such as oVirt®, RHEVM®, VMWARE®, Foreman®, and/or other platforms providing similar functionality. In certain implementations, host management service 110 may be employed to perform host discovery, provisioning, configuration, monitoring, and/or other management functions with respect to a plurality of bare metal hosts, host clusters, and/or virtual machines that act as containers for executing containerized applications in accordance with one or more aspects of the present disclosure.

Container orchestration service 120 may be employed to manage multiple containerized applications running on a plurality of host computer systems 150A-150Z and/or a plurality of virtual machines 160A-160Z, by employing a certain containerized execution model for packaging, instantiating, and executing the containerized applications. In various illustrative examples, container orchestration service may be implemented by a container management platform, such as Kubernetes® and/or other platforms providing similar functionality. In certain implementations, the containerized execution model may be provided by Docker® or other similar model defining the interface between an application and the underlying host.

In certain implementations, container orchestration service 120 may export one or more application programming interface (API) calls, through which an external system may provide to container orchestration service 120 identifiers of one or more hosts that container orchestration service 120 may employ for running containerized applications.

A host may be represented by a host computer system or by a virtual machine being executed by a host computer system. In various illustrative examples, a host identifier may be provided by a network address (e.g., IP address) associated with a network interface of the host, a Domain Name System (DNS) name associated with a network interface of the host, or by any other suitable identifier.

In accordance with one or more aspects of the present disclosure, host discovery component 130 provides the host discovery interface between container orchestration service 120 and host management service 110. In accordance with one or more aspects of the present disclosure, host discovery component 130 may input a set of host definition parameters, which describe the requirements to hosts that may be utilized by the container orchestration service for running containerized applications. In various illustrative examples, host discovery component 130 may receive the host definition via a graphical user interface (GUI) or via an application programming interface (API).

The host definition parameters may define the processor, memory, networking configuration, storage configuration, and/or other host attributes. In various illustrative examples, the host definition parameters may define the requisite processor type of the host, the lowest acceptable processor frequency, the minimum amount of memory available to the host, identifiers of networks to which the host should be connected, identifiers of available storage domains, etc.

Host discovery component 130 may then translate the host definition parameters into a one or more host definition rules. In an illustrative example, a host definition rule may comprise a plurality of name-value pairs joined by logical operators, wherein, in each name-value pair, the name references a certain host parameter, and the value references the requisite or threshold parameter value.

Host discovery component 130 may then produce a host discovery request 170 comprising one or more host definition rules and may forward the host discovery request to host management service 110. In an illustrative example, host discovery component 130 may transmit the host discovery request immediately responsive to receiving and processing the host definition parameters. Alternatively, host discovery component 130 may transmit one or more outstanding host discovery queries periodically, until the query is fulfilled by host management service 110 or until a timeout associated with the query is expired. Alternatively, host discovery component 130 may transmit one or more outstanding host discovery queries responsive to an external event, such as a certain message received from host management service 110 or from other component of distributed computer system 100.

Host management service 110 may respond to the host discovery request by a host discovery response 180 comprising identifiers of one or more hosts that satisfy the host discovery request. Responsive to receiving the host discovery response, host discovery component 130 may forward, to container orchestration service 120, a message 190 comprising one or more host identifiers received from host management service 110.

Figure 2:
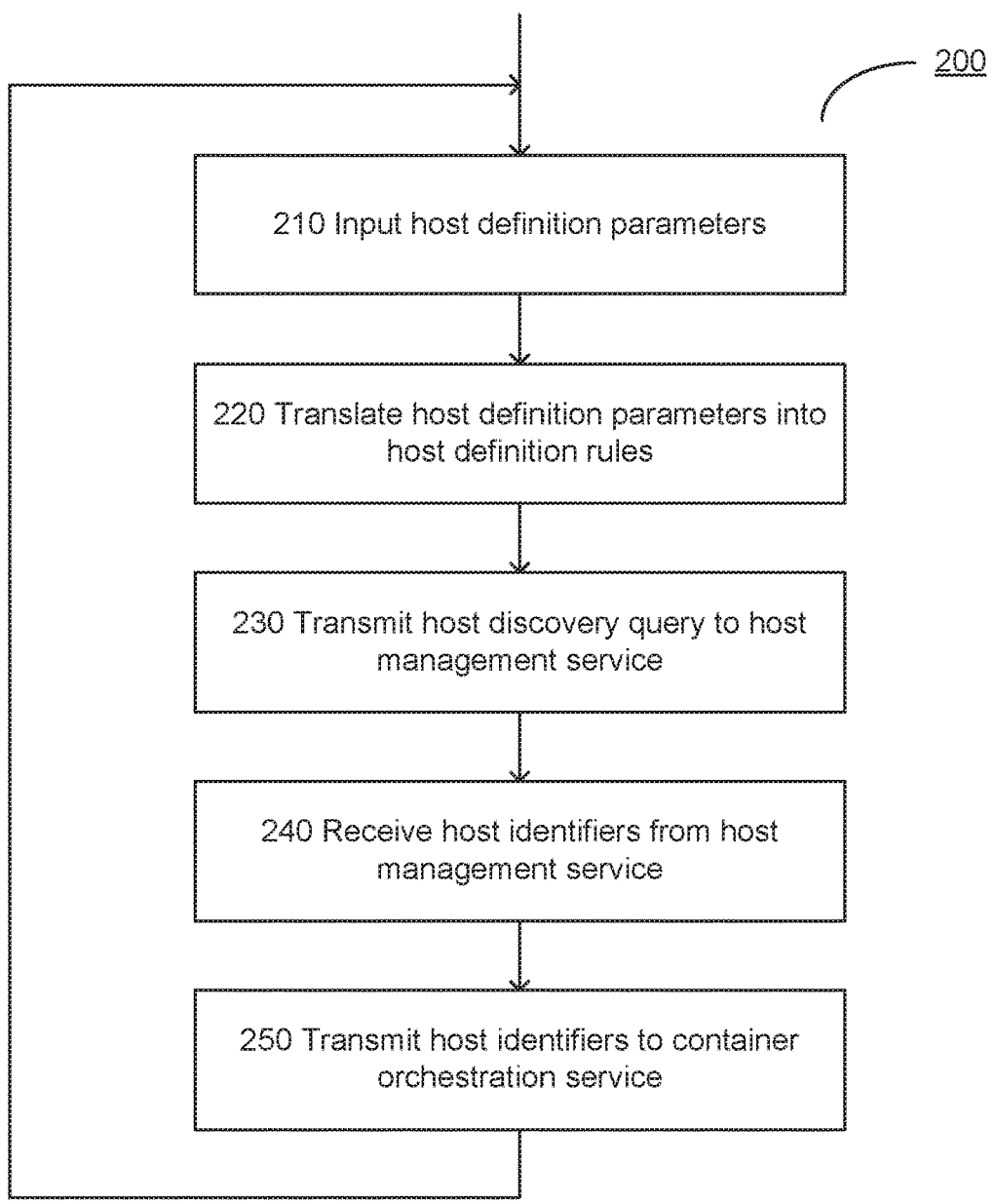
FIG. 2 depicts a flow diagram of a method for performing discovery of hosts to be employed for hosting containerized applications, in accordance with one or more aspects of the present disclosure.

FIG. 2 depicts a flow diagram of one illustrative example of a method 200 for performing discovery of hosts to be employed for hosting containerized applications, in accordance with one or more aspects of the present disclosure. Method 200 and/or each of its individual functions, routines, subroutines, or operations may be performed by one or more processing devices of the computer system (e.g., host computer system 100 of FIG. 1) implementing the method. In certain implementations, method 200 may be performed by a single processing thread. Alternatively, method 200 may be performed by two or more processing threads, each thread executing one or more individual functions, routines, subroutines, or operations of the method. In an illustrative example, the processing threads implementing method 200 may be synchronized (e.g., using semaphores, critical sections, and/or other thread synchronization mechanisms). Alternatively, the processing threads implementing method 200 may be executed asynchronously with respect to each other.

At block 210, a processing device of a computer system running the host discovery component may input a set of host definition parameters, which describe the requirements to hosts that may be utilized by the container orchestration service for running containerized applications. In various illustrative examples, host discovery component 130 may receive the host definition via a graphical user interface (GUI) or via an application programming interface (API), as described in more details herein above.

At block 220, the processing device may translate the host definition parameters into a one or more host definition rules. In an illustrative example, a host definition rule may comprise a plurality of name-value pairs joined by logical operators, wherein, in each name-value pair, the name references a certain host parameter, and the value references the requisite or threshold parameter value, as described in more details herein above.

At block 230, the processing device may transmit a host discovery request comprising one or more host definition rules to a host management service, as described in more details herein above.

At block 240, the processing device may receive, from the host management service, identifiers of one or more hosts that satisfy the host definition rules. In various illustrative examples, a host identifier may be provided by a network address (e.g., IP address) associated with a network interface of the host, a Domain Name System (DNS) name associated with a network interface of the host, or by any other suitable identifier, as described in more details herein above.

At block 250, the processing device may provide the host identifiers to a container orchestration service, as described in more details herein above. Upon completing the operations referenced by block 250, the method may loop back to block 210.

Figure 3:
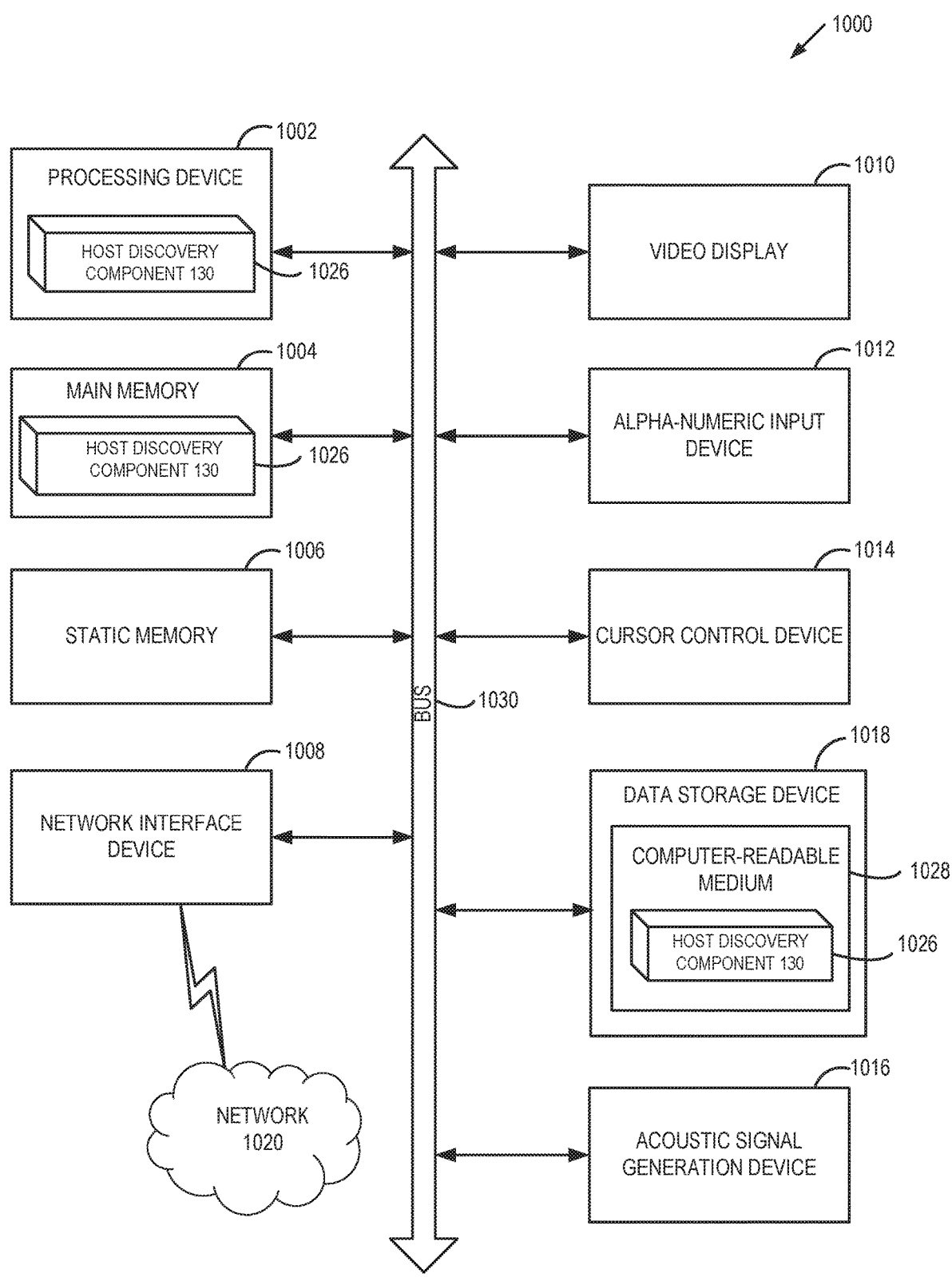
FIG. 3 depicts a block diagram of an example computer system operating in accordance with one or more aspects of the present disclosure.

FIG. 3 schematically illustrates a component diagram of an example computer system 1000 which can perform any one or more of the methods described herein. In various illustrative examples, computer system 1000 may run host management service 110, container orchestration service 120, and host discovery component 130 of FIG. 1.

Example computer system 1000 may be connected to other computer systems in a LAN, an intranet, an extranet, and/or the Internet. Computer system 1000 may operate in the capacity of a server in a client-server network environment. Computer system 1000 may be a personal computer (PC), a set-top box (STB), a server, a network router, switch or bridge, or any device capable of executing a set of instructions (sequential or otherwise) that specify actions to be taken by that device. Further, while only a single example computer system is illustrated, the term "computer" shall also be taken to include any collection of computers that individually or jointly execute a set (or multiple sets) of instructions to perform any one or more of the methods discussed herein.

Example computer system 1000 may comprise a processing device 1002 (also referred to as a processor or CPU), a main memory 1004 (e.g., read-only memory (ROM), flash memory, dynamic random access memory (DRAM) such as synchronous DRAM (SDRAM), etc.), a static memory 1006 (e.g., flash memory, static random access memory (SRAM), etc.), and a secondary memory (e.g., a data storage device 1018), which may communicate with each other via a bus 1030.

"Processor" or "processing device" herein refers to a device capable of executing instructions encoding arithmetic, logical, or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

Processing device 1002 represents one or more general-purpose processing devices such as a microprocessor, central processing unit, or the like. More particularly, processing device 1002 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 1002 may also be one or more special-purpose processing devices such as an application specific integrated circuit (ASIC), a field programmable gate array (FPGA), a digital signal processor (DSP), network processor, or the like. In accordance with one or more aspects of the present disclosure, processing device 1002 may be configured to execute host discovery component 130 implementing method 200 for performing discovery of hosts to be employed for hosting containerized applications.

"Memory device" herein refers to a volatile or non-volatile memory device, such as RAM, ROM, EEPROM, or any other device capable of storing data. "I/O device" herein refers to a device capable of providing an interface between a processor and an external device capable of inputting and/or outputting binary data. In an illustrative example, an I/O device may be provided by a network interface controller (NIC) or a block I/O device, such as a disk.

Example computer system 1000 may further comprise a network interface device 1008, which may be communicatively coupled to a network 1020. Example computer system 1000 may further comprise a video display 1010 (e.g., a liquid crystal display (LCD), a touch screen, or a cathode ray tube (CRT)), an alphanumeric input device 1012 (e.g., a keyboard), a cursor control device 1014 (e.g., a mouse), and an acoustic signal generation device 1016 (e.g., a speaker).

Data storage device 1018 may include a computer-readable storage medium (or more specifically a non-transitory computer-readable storage medium) 1028 on which is stored one or more sets of executable instructions 1026. In accordance with one or more aspects of the present disclosure, executable instructions 1026 may comprise executable instructions encoding various functions of host discovery component 130 implementing method 200 for performing discovery of hosts to be employed for hosting containerized applications.

Executable instructions 1026 may also reside, completely or at least partially, within main memory 1004 and/or within processing device 1002 during execution thereof by example computer system 1000, main memory 1004 and processing device 1002 also constituting computer-readable storage media. Executable instructions 1026 may further be transmitted or received over a network via network interface device 1008.

While computer-readable storage medium 1028 is shown in FIG. 3 as a single medium, the term "computer-readable storage medium" should be taken to include a single medium or multiple media (e.g., a centralized or distributed database, and/or associated caches and servers) that store the one or more sets of VM operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus may be specially constructed for the required purposes, or it may be a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages may be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but may be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A method, comprising:
   generating, by a processing device, a host definition rule specifying a value of a host definition parameter;
   transmitting, to a host management service, a host discovery request comprising the host definition rule, wherein transmitting the host discovery request is performed periodically until expiration of a timeout associated with the request;
   receiving, from the host management service, an identifier of a host that satisfies the host definition rule; and
   providing the identifier of the host to an orchestration service employed to instantiate and run a plurality of virtualized execution environments.

2. The method of claim 1, wherein the host management service is employed to perform at least one of: host discovery, provisioning, configuration, or monitoring, with respect to a plurality of hosts comprising at least one of: a bare metal host or a virtual machine.

3. The method of claim 1, wherein providing the identifier of the host to the container orchestration service is performed via an application programming interface (API) call exported by the container orchestration service.

4. The method of claim 1, wherein the host is provided by one of: a computer system or a virtual machine.

5. The method of claim 1, wherein each virtualized execution environment is provided by an application container.

6. The method of claim 1, wherein the host definition rule further comprises a network configuration parameter.

7. The method of claim 1, wherein the host definition rule further comprises a storage configuration parameter.

8. The method of claim 1, wherein the host definition rule further comprises a processor type identifier.

9. The method of claim 1, wherein the host definition rule further specifies an amount of memory available to the host.

10. A system comprising:
    a memory; and
    a processing device, operatively coupled to the memory, to:
       generate a host definition rule specifying an identifier of a storage domain;
       transmit, to a host management service, a host discovery request comprising the host definition rule, wherein transmitting the host discovery request is performed periodically until expiration of a timeout associated with the request;
       receiving, from the host management service, an identifier of a host that satisfies the host definition rule; and
       providing the identifier of the host to a container orchestration service employed to instantiate and run, on one or more hosts, a plurality of application containers.

11. The system of claim 10, wherein the host is provided by one of: a computer system or a virtual machine.

12. The system of claim 10, wherein the host definition rule further comprises a network configuration parameter.

13. The system of claim 10, wherein the host definition rule further comprises a processor type identifier.

14. The system of claim 10, wherein the host definition rule further specifies an amount of memory available to the host.

15. A computer-readable non-transitory storage medium comprising executable instructions that, when executed by a processing device, cause the processing device to:
    generate a host definition rule specifying a value of a host definition parameter;
    transmitting, to a host management service, a host discovery request comprising the host definition rule, wherein transmitting the host discovery request is performed periodically until expiration of a timeout associated with the request;
    receiving, from the host management service, an identifier of a host that satisfies the host definition rule; and
    providing the identifier of the host to an orchestration service employed to instantiate and run a plurality virtualized execution environments.

16. The computer-readable non-transitory storage medium of claim 15, wherein the host is provided by one of: a computer system or a virtual machine.

17. The computer-readable non-transitory storage medium of claim 15, wherein the host definition rule further comprises a network configuration parameter.

18. The computer-readable non-transitory storage medium of claim 15, wherein the host definition rule further comprises a storage configuration parameter.

19. The computer-readable non-transitory storage medium of claim 15, wherein the host definition rule further comprises a processor type identifier.

20. The computer-readable non-transitory storage medium of claim 15, wherein the host definition rule further specifies an amount of memory available to the host.

* * * * *